United States Patent [19]

Roelants

[11] Patent Number: 4,491,393
[45] Date of Patent: Jan. 1, 1985

[54] SWITCHING DEVICE FOR LIGHT BEAMS

[75] Inventor: Marc M. M. Roelants, Brussels, Belgium

[73] Assignee: U.S. Philips Corporation, New York, N.Y.

[21] Appl. No.: 373,181

[22] Filed: Apr. 29, 1982

[30] Foreign Application Priority Data

May 13, 1981 [NL] Netherlands ............ 8102342

[51] Int. Cl.³ .............................. G02F 1/03
[52] U.S. Cl. ...................... 350/388; 350/392
[58] Field of Search ............ 350/353, 355–356, 350/377, 387–388, 392; 365/109, 112, 117; 340/718, 763; 358/232, 241, 293

[56] References Cited

U.S. PATENT DOCUMENTS

| | | | |
|---|---|---|---|
| 2,909,973 | 10/1959 | Koelsch, Jr. et al. | 350/388 |
| 3,312,957 | 4/1967 | Fleisher et al. | 350/392 |
| 3,520,054 | 7/1970 | Pensack et al. | 174/68.5 |
| 3,529,212 | 9/1970 | Ballard | 174/68.5 |
| 3,619,899 | 11/1971 | Takeda et al. | 174/68.5 |
| 3,659,917 | 5/1972 | Boutineau | 350/356 |
| 3,663,088 | 5/1972 | Maldonado et al. | 350/392 |
| 3,709,586 | 1/1973 | Lipp | 350/356 |
| 3,717,800 | 2/1973 | Thillays et al. | 178/68.5 |
| 4,229,079 | 10/1980 | Wayne et al. | 350/356 |

OTHER PUBLICATIONS

Butter et al., "Thermoplastic Holographic Recording of Binary Patterns in PLZT Line Composer", IEEE Trans on Computers, vol. C-24, 4-1975, pp. 402-406.

Primary Examiner—William H. Punter
Attorney, Agent, or Firm—Robert J. Kraus

[57] ABSTRACT

The switching device comprises a switching member with a row of windows, each of which is formed by a separate block of electro-optical material (19) which is connected to a first surface (18) of a rigid carrier (17) by means of an intermediate layer of flexible material (21). Each block comprises two oppositely situated, parallel, light-transmissive principal surfaces (23, 25) and two side surfaces (27, 29) which are also oppositely situated and which extend from one principal surface to the other. On the side surfaces there are provided two electrodes (31, 33) which are connected to two conductors (35, 37) which are constructed as surface wiring. The electrodes and/or the connection between the carrier and the conductors are preferably also formed to be flexible. This construction offers the advantage that the various blocks cannot mechanically or electrically interact with one another.

11 Claims, 5 Drawing Figures

PHN 10049

SWITCHING DEVICE FOR LIGHT BEAMS

BACKGROUND OF THE INVENTION

The invention relates to a switching device for light beams, comprising a switching member with at least one row of windows. Each window consists of a block of electro-optical material which is connected to a first surface of a rigid carrier and which is formed with two oppositely situated, parallel, light-transmissive principal surfaces and two side surfaces which are also oppositely situated and which extend between the principal surfaces. Across each side surface is an electrode which is conductively connected to a conductor.

A device of this kind is known from U.S. Pat. No. 3,873,187. The known device comprises a switching member in the form of a rigid carrier, for example, a glass plate on which there are provided blocks of electro-optical material, for example, PLZT. The space between each pair of adjacently situated blocks is filled with conductive material in which a thin wire conductor is embedded. This conductive material together with its associated wire conductor forms an electrode on each of the side surfaces of the blocks facing the space. When a potential difference is applied between the electrodes on opposite sides of a block, the intermediate electro-optical material becomes double-refractive. When the switching member is arranged between a polarizer and an analyzer, the intensity of a light beam passing through a block can be varied by varying the potential difference between the associated electrodes, so that a switching device for light beams is provided. Switching devices of this kind can be used, for example, in devices for reading or printing documents, such as transmitters and receivers of facsimile systems.

Electrodes of adjacently situated blocks are connected to a common conductor in the switching member of the known switching device, so that a signal applied to a block could influence an adjacent block. Moreover, the electro-optical material generally also has piezo-electric properties so that when a potential difference is applied between the electrodes, the material tends to contract or expand, thus causing stresses in the carrier which have an unintended effect, via the carrier, on the double refraction in other blocks.

SUMMARY OF THE INVENTION

The invention has for its object to provide a switching device of the kind set forth in which the blocks of electro-optical material are better isolated from one another, electrically as well as mechanically, so that they will less readily influence one another.

To achieve this, the device in accordance with the invention is characterized in that between each block of electro-optical material and the first surface of the rigid carrier there is provided a layer of flexible material which extends parallel to said first surface, at least one of the two conductors being constructed as surface wiring on a surface of the carrier or of a body mounted on the carrier.

Because the blocks are mechanically interconnected only by means of a flexible (elastically or plastically deformable) material, they can freely contract and expand without affecting one another. Moreover, the conductors which are constructed as surface wiring can be readily designed so that at least one electrode of each block has an independent conductor which is not connected to another electrode.

The former advantage is even greater in a preferred embodiment of a switching device in accordance with the invention which is characterized in that in the flexible layer which is parallel to the first surface of the carrier a gap is provided between every pair of adjacently arranged blocks.

BRIEF DESCRIPTION OF THE DRAWING

The invention will be described in detail hereinafter with reference to the drawing wherein.

DESCRIPTION OF THE PREFERRED EMBODIMENTS

Figure 1:
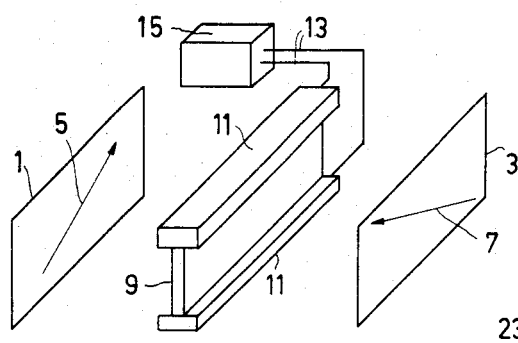
FIG. 1 is a diagrammatic perspective view of an embodiment of a switching device in accordance with the invention.

The switching device for light beams which is diagrammatically shown in FIG. 1 comprises a polarizer 1 and an analyzer 3 whose mutually perpendicular polarization directions are denoted by arrows 5 and 7, respectively. Between the polarizer 1 and the analyzer 3 there is arranged a switching member 9 which comprises, as will be described in detail hereinafter, a row of windows which are arranged on a carrier and each of which consists of a block of electro-optical material with electrodes which are conductively connected to conductors which are provided as surface wiring on the carrier or on a body mounted on the carrier. These conductors are connected to connection members 11 which communicate with a control member 15 via leads 13. The general construction of such switching devices is known per se, for example, from French Patent Application No. 2,403,577 (corresponding to U.S. Pat. No. 4,222,638) laid open to public inspection and from U.S. Pat. No. 3,430,212 which also mentions a number of applications. For a proper understanding of the invention the construction of the switching member is of particular importance; some embodiments thereof will be described hereinafter.

Figure 2:
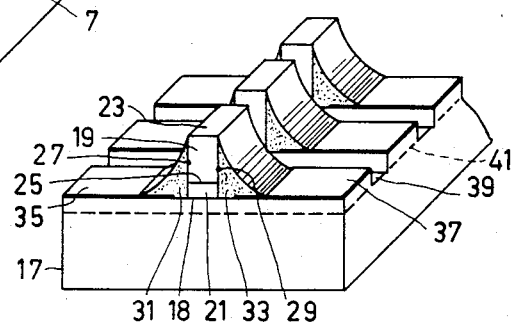
FIG. 2 is a perspective view of a first embodiment of a switching member for the switching device shown in FIG. 1.

FIG. 2 shows a simple embodiment, comprising a plate-shaped carrier 17 of a rigid, transparent material. On a first surface 18 of the carrier 17 (the upper surface in FIG. 2) there is provided a row of windows, each of which consists of a separate block 19 of an electro-optical material, for example, PLZT. Between the block 19 and the first surface 18 of the carrier 17 there is provided a layer 21 of a transparent flexible (elastic or plastic) material which extends parallel to said first surface and by means of which the block is secured to the first surface. This material consists of, for example, an adhesive which does not become rigid after setting. The block 19 comprises two parallel, oppositely situated, light-transmissive principal surfaces, one of which forms the upper surface 23 in FIG. 2 whilst the other surface forms the lower surface 25 which is connected to the elastic layer 21. A light beam to be switched can enter and leave the block 19 via these principal surfaces.

The block 19 further comprises two side surfaces 27 and 29 which are also situated facing one another and which extend between the two principal surfaces 23, 25. If desired, these side surfaces may be metallized. Two electrodes 31 and 33 extend over the side surfaces 27 and 29 which, respectively, form the left and the right surfaces of the block 19 in FIG. 2. Each of these electrodes is formed by an electrically conductive paste which is introduced between the respective side surface 27, 29 and an associated conductor 35, 37, and which solidifies after application. The conductors 35, 37 are constructed as surface wiring provided on the first surface 18 of the carrier 17.

The blocks 19 are connected to the rigid carrier 17 both via the flexible layer 21 and via the electrodes 31, 33 and the conductors 35, 37. In order to ensure that each block 19 can freely expand and contract, a material is used for the electrodes 31, 33 which remains flexible after solidification, so that no rigid connection is formed between the block 19 and the carrier 17.

In order to minimize the mutual interaction of adjacently arranged blocks 19, gaps or cuts 39 are provided in the flexible layer 21 between each block and the next. The depth of these cuts exceeds the thickness of the flexible layer 21, so that the cuts continue into the carrier 17 as far as a plane denoted by a broken line 41. The creepage path between adjacent electrodes and conductors is thus also increased, thus providing better electrical isolation for the windows. If desired, the conductors and electrodes may be interconnected when they are applied, after which they are separated as a result of forming the gaps 39. The manufacture is thus simplified.

Figure 3:
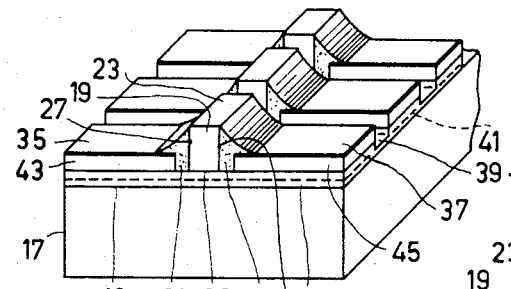
FIG. 3 is a perspective view of a second embodiment of a switching member for the switching device shown in FIG. 1.

A rigid mechanical coupling between the blocks 19 and the carrier 17 via the electrodes 31, 33 and the conductors 35, 37 may be avoided in a different manner, as will be apparent from the embodiment shown in FIG. 3. Corresponding parts in this figure are denoted by the same reference numerals as those used in FIG. 2. The transparent flexible layer 21 of the embodiment shown in FIG. 3 extends over the entire first surface 18 of the carrier 17. The conductors 35, 37 are constructed as surface wiring on a surface of a body 43, 45 which is parallel to the first surface 18 and which is mounted on the flexible layer 21 present on the carrier 17. Because of the fact that the electrodes 31, 33 and the bodies 43, 45 contact the carrier 17 only via the flexible layer 21, no rigid mechanical coupling exists between the blocks 19 and the carrier even when the electrodes are constructed so as to be rigid. In order to increase this effect, the bodies 43, 45 may also be made of a flexible material, if desired.

The gaps 39 in this case have such a depth that the plane 41 is situated in the flexible layer 21. However, an equally effective electrical isolation of adjacent conductors will still be provided, because the conductors 35, 37 are situated at a higher level due to the bodies 43, 45. The conductors 35, 37 may alternatively be formed directly on the flexible layer 21 which would then perform the function of the bodies 43, 45. In that case it may sometimes be desirable to make the gaps 39 slightly deeper.

Figure 4:
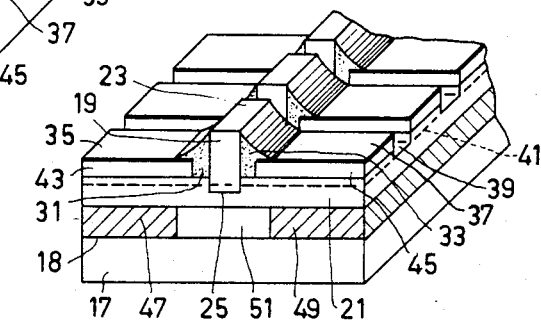
FIG. 4 is a perspective view of a third embodiment of a switching member for the switching device shown in FIG. 1.

In some cases it may be desirable to secure the blocks 19 even more firmly to the flexible layer 21 than in the two previous embodiments. A solution in this respect is shown in FIG. 4 in which the same reference numerals are used for corresponding parts. The block 19 of this embodiment is sunk into the flexible layer 21 to a given depth, so that the anchoring is improved. In order to prevent the anchoring from being lost in the direction of the row of windows due to the gaps 39, the plane 41 which indicates the depth of these cuts must be situated above the surface 25 of the blocks 19. The method of forming the conductors 35, 37 and the electrodes 31, 33 may be the same as for the embodiment shown in FIG. 3.

The fact that the conductors 35, 37 are arranged on a flexible substrate in the embodiments shown in the FIGS. 3 and 4 is advantageous when the connection between these conductors and the leads 13 in FIG. 1 is to be realized by means of pressure contacts. The spring force required for a pressure contact is thus produced entirely or partly by the flexible layer 21, which in this case is preferably elastic. Layer 21 can provide this spring force in cooperation with the bodies 43, 45 when these are made of an elastic material. if desired, this effect can be enhanced by providing (as shown in FIG. 4) underneath the conductors 35, 37, additional resilient layers 47, 49 between the elastic layer 21 and the first surface 18 of the carrier 17. Between these two resilient layers 47, 49, which, of course, need not be transparent, a transparent region 51 must be left in the vicinity of the blocks 19. This clear region can be filled with a transparent material which may have polarizing properties, if desired, in which case it can form the polarizer 1 (FIG. 1). The polarizer 1 may alternatively be formed by using a plate of a polarizing material for the carrier 17.

Figure 5:
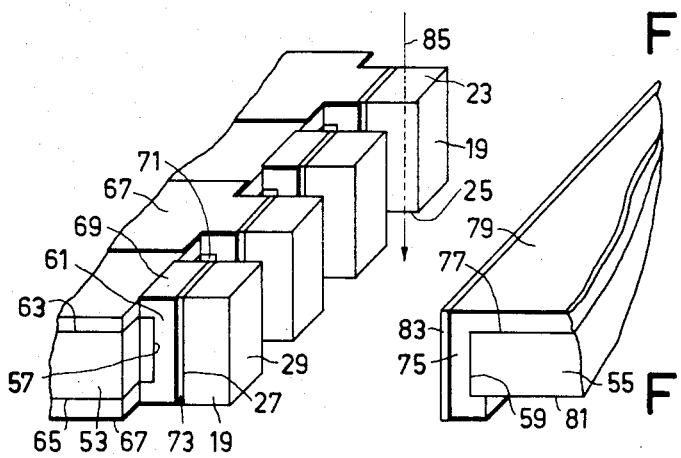
FIG. 5 is a perspective exploded view of a fourth embodiment of a switching member for the switching device shown in FIG. 1.

FIG. 5 shows a fourth embodiment of a switching member in an exploded view. Blocks of electro-optical material 19 are situated between a first rigid carrier 53 and a second rigid carrier 55 in this embodiment. Both carriers are formed as thick plates and are arranged to be mutually parallel so that a side surface 57 of the first carrier 53 is situated parallel to and facing a side surface 59 of the second carrier. The two side surfaces 57, 59 form the first surfaces of the carriers between which the blocks 19 are situated.

On the first surface 57 of the first carrier 53 there is provided a flexible layer 61 which also extends across two adjacent, oppositely situated second surfaces 63 and 65 which constitute the two principal surfaces of the plate-shaped first carrier. On the flexible layer 61 there is provided surface wiring in the form of conductors 67. Each conductor 67 is situated on a part of the flexible layer 61 which bears on the first surface 57 and extends therefrom to a portion of said flexible layer which is situated on one of the two surfaces 63, 65. One out of every pair of conductors 67 which are directly adjacent on the first surface 57, i.e. so that they belong to directly adjacent blocks 19, extends mainly over the upper second surface 63 while the other extends mainly over the lower second surface 65, so that they are situated on different sides of the first carrier 53. As a result of this arrangement, the distances between the blocks 19 may be small, while the distances between neighboring conductors 67 on the two surfaces 63, 65 are still maintained comparatively large. Thus, a high packing density is provided for the switching members, without cross-talk occurring between neighbouring conductors 67. In order to improve the adhesion between the conductors 67 and that part of the elastic layer 61 which is situated over the first surface 57, each conductor 67 includes a very short, terminal portion 69 which is located on the second surface 63 or 65 which is situated opposite the other second surface over which the conductor mainly extends. These terminal ends do not increase the mutual electrical interaction between neighbouring conductors 67, because they are very short and because, moreover, in the vicinity of these terminal ends there are provided cut away regions or gaps 71 which are cut through that portion of the flexible layer 61 which is parallel to the first surface 57 and also through a portion of the first carrier 53 which is situated therebelow. These cut away regions also serve to improve the mechanical decoupling of adjacent blocks 19.

On the portion of each conductor 67 which is parallel to the first surface 57 there is provided an electrically conductive layer of adhesive material 73 which serves to secure one of the blocks 19 to the first carrier 53 and which also forms a first electrode which extends over the first side surface 27 of the block. The layer of adhesive 73 may be a flexible adhesive, if desired.

On the first surface 59 of the second carrier 55 there is also provided a flexible layer 75 which in this case extends across one adjacent second surface 77 which forms the principal surface of the plate-shaped second carrier. On the flexible layer 75 there is again provided a surface wiring which, however, forms an uninterrupted conductive layer 79 which comprises the second conductors associated with all the blocks 19, said second conductors thus being electrically interconnected. It will be apparent that the manufacture is thus simplified, whilst individual control of each window remains possible because the conductors 67 on the first carrier 53 are separated from one another. The flexible layer 75 with the conductive layer 79 is again continued for a very small distance over the oppositely situated second surface 81 of the second carrier 55 in order to improve adhesion.

On the portion of the conductive layer 79 which is parallel to the first surface 59 there is again provided an electrically conductive and, if desired, flexible layer of adhesive 83 which serves to secure the blocks 19 to the second carrier 55 and which also forms a second electrode which extends across the second side surface 29 of each block. To achieve this end, after mounting the blocks 19 on the first carrier 53 and after the application of the conductive layer of adhesive 83 to the second carrier 55, this second layer of adhesive is pressed against the second side surfaces 29 of the blocks. The two principal surfaces 23, 25 of the blocks 19, extending perpendicularly to the first surfaces 57, 59 of the carriers 53, 55, will then be situated in the space between the two carriers. Thus, a switching member is obtained in which the two principal surfaces 23, 25 of the blocks are not covered by any material, so that a light beam 85 passing through these blocks will not be attenuated in any way.

When both layers of adhesiver 73, 83 are flexible, the flexible layers 61, 75 may be omitted, if desired.

What is claimed is:

1. A switching device for light beams including a switching member comprising:
   a. a rigid carrier;
   b. an arrangement of electro-optical light transmission elements flexibly attached to the rigid carrier, each element including (1) a block of electro-optical material having oppositely disposed light-transmitting end surfaces and oppositely disposed side surfaces extending between said end surfaces, and (2) an electrode extending across each of said side surfaces;
   c. flexible material disposed between each element and the rigid carrier for effecting said flexible attachment; and
   d. a plurality of conductors electrically-connected to the electrodes, each of said conductors including a conductive layer attached to the rigid carrier and a portion flexibly attached to at least one of said electrodes.

2. A device as in claim 1 where the flexible material comprises a continuous layer disposed between the light transmission elements and the rigid carrier.

3. A device as in claim 1 or 2 having channels formed in the device between adjacent ones of the conductors.

4. A device as in claim 1 wherein the flexible material between each light transmission element and the rigid carrier comprises a separate element.

5. A switching device for light beams including a switching member comprising:
   a. a light-transmissive rigid carrier;
   b. an arrangement of electro-optical light transmission elements flexibly attached to the rigid carrier, each element including (1) a block of electro-optical material having oppositely disposed light-transmitting end surfaces, one of which faces the rigid carrier, and having oppositely disposed side surfaces extending between said end surfaces, and (2) an electrode extending across each of said side surfaces;
   c. light-transmissive flexible material disposed between each element and the rigid carrier for effecting said flexible attachment; and
   d. a plurality of conductors electrically-connected to the electrodes, each of said conductors including a conductive layer attached to the rigid carrier and a portion flexibly attached to at least one of said electrodes.

6. A device as in claim 5 wherein each electrode consists essentially of a flexible conductive material and where the portion of the conductor flexibly attached to the electrode comprises a conductive layer on said electrode.

7. A device as in claim 5 wherein said light-transmissive flexible material comprises a continuous layer disposed between the elements and the rigid carrier and between the conductive layers and the rigid carrier.

8. A switching device for light beams including a switching member comprising:
   a. first and second rigid carriers;
   b. an arrangement of electro-optical light transmission elements disposed between and flexibly attached to the rigid carriers, each element including (1) a block of electro-optical material having oppositely disposed light-transmitting end surfaces and oppositely disposed first and second side surfaces extending between said surfaces, and (2) an electrode extending across each of said side surfaces;
   c. flexible material disposed between the first side surface of each element and the first rigid carrier and between the second side surface of each element and the second rigid carrier for effecting said flexible attachment; and
   d. a plurality of conductors electrically-connected to the electrodes, each of said conductors including a conductive layer attached to one of the rigid carriers and including a portion flexibly attached to at least one of said electrodes.

9. A device as in claim 8 where the conductive layers are flexibly attached to the rigid carriers by means of flexible material disposed between said conductive layers and said rigid carriers.

10. A device as in claim 8 wherein the conductors attached to the first rigid carrier are each flexibly attached to the electrode on the first side surface of a different element, the conductors attached to adjacent ones of the first side surfaces being disposed on opposite sides of the first rigid carrier, and where the conductors attached to the second rigid carrier and to the electrodes on the second side surfaces of the elements are each formed by a continuous conductive layer.

11. A device as in claim 8, 9 or 10 where said electrodes consist essentially of a flexible, conductive adhesive material.

* * * * *